(No Model.)
J. R. MORGAN.
FRICTION CLUTCH.
No. 472,739.
5 Sheets—Sheet 2.
Patented Apr. 12, 1892.
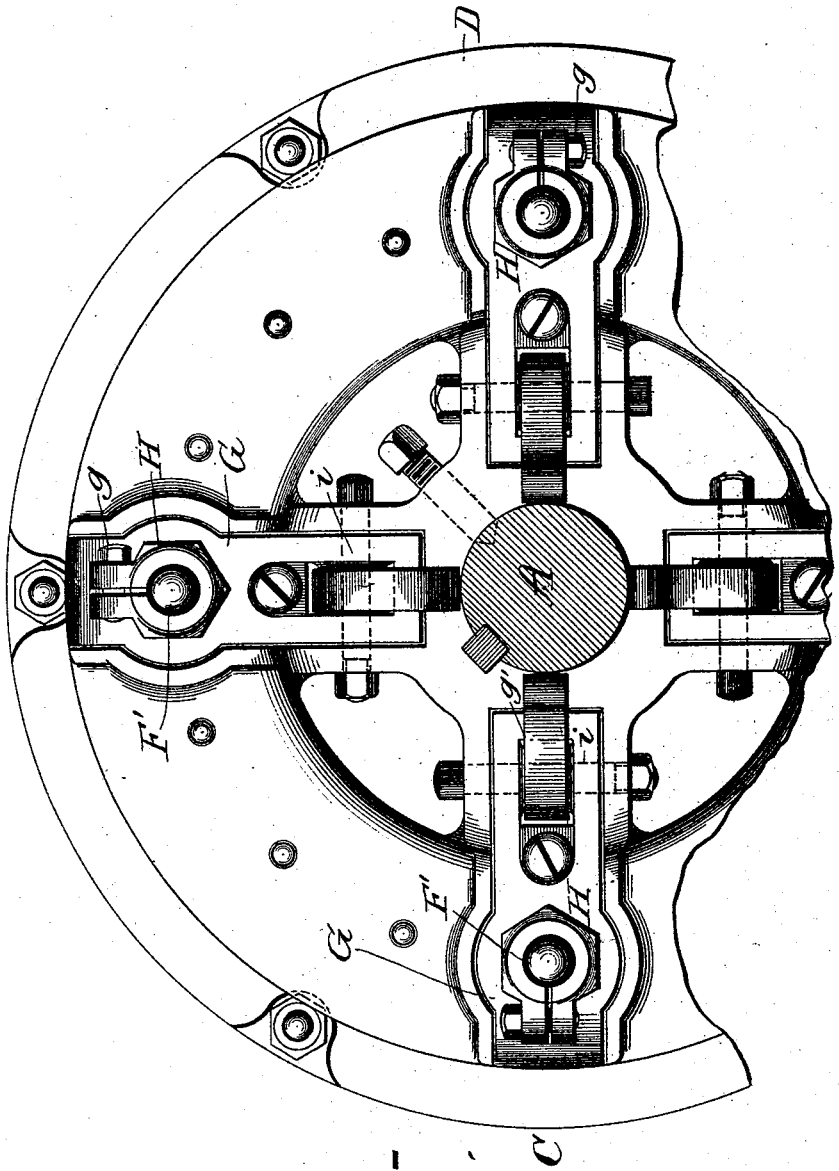
Witnesses
E. Mottingham
V. E. Hodges.
Inventor
John R Morgan
By H. A. Simmons.
Attorney (No Model.) 5 Sheets—Sheet 3.
J. R. MORGAN.
FRICTION CLUTCH.
No. 472,739. Patented Apr. 12, 1892.
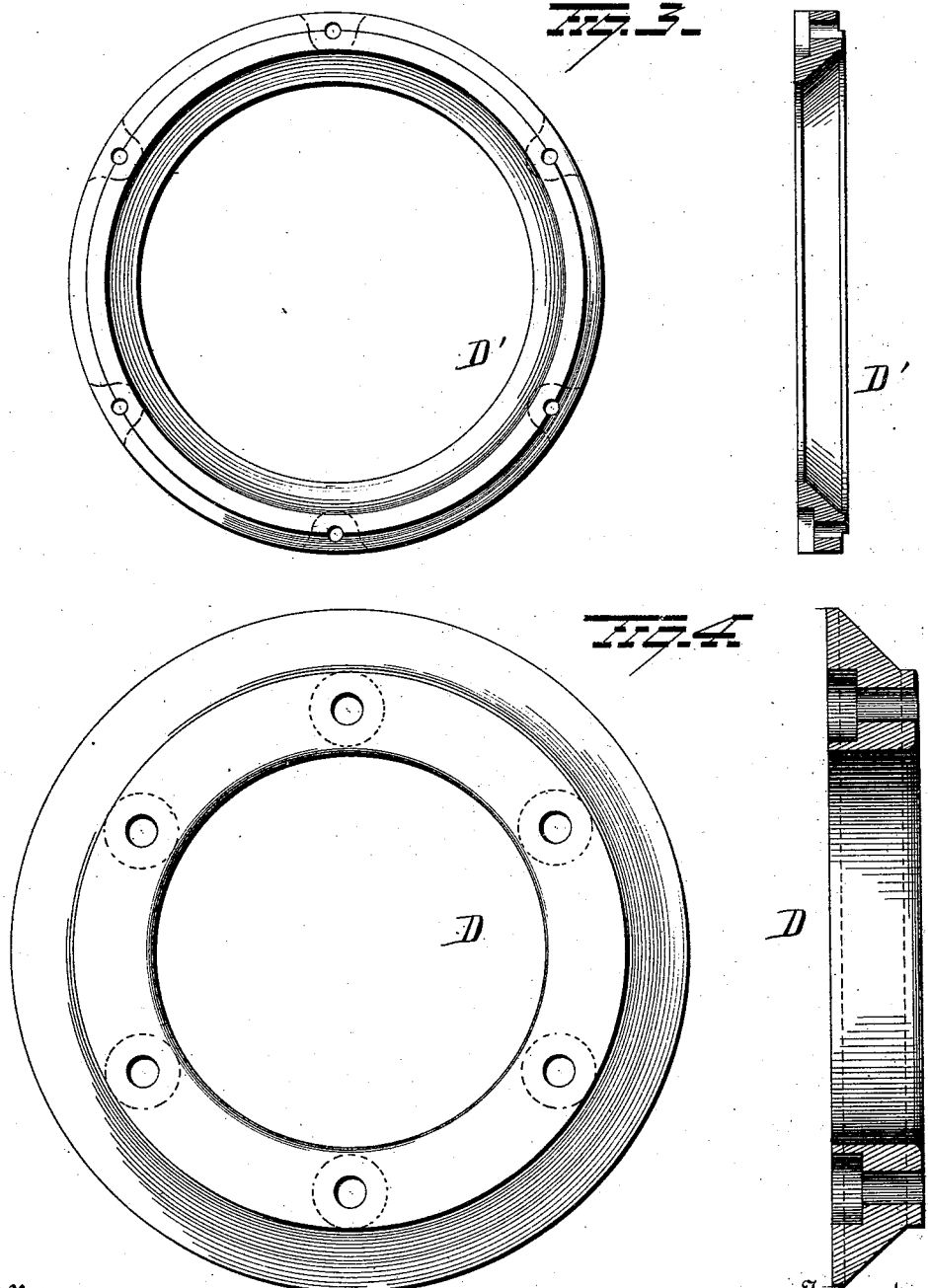

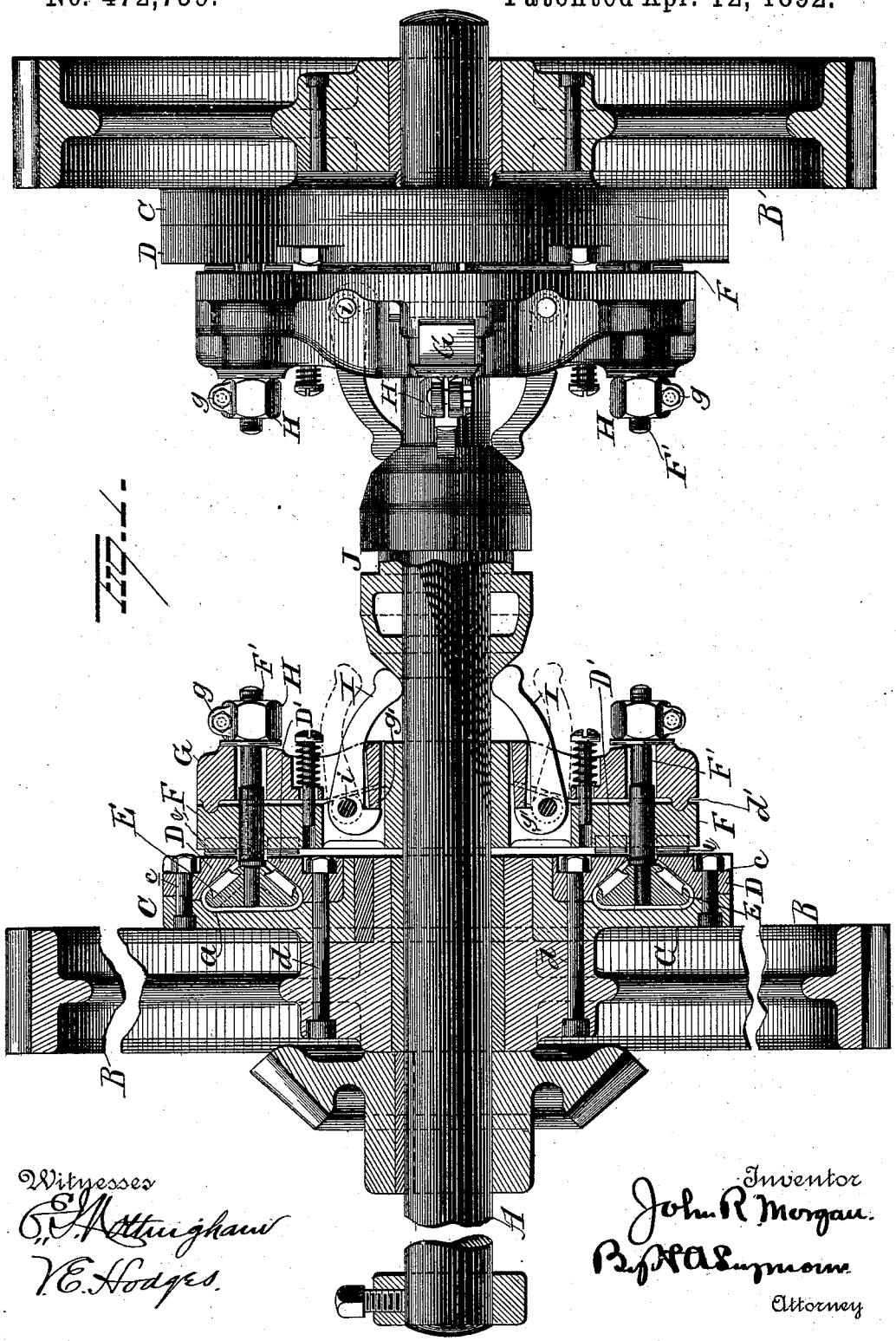

(No Model.) J. R. MORGAN. 5 Sheets—Sheet 4.
FRICTION CLUTCH.
No. 472,739. Patented Apr. 12, 1892.
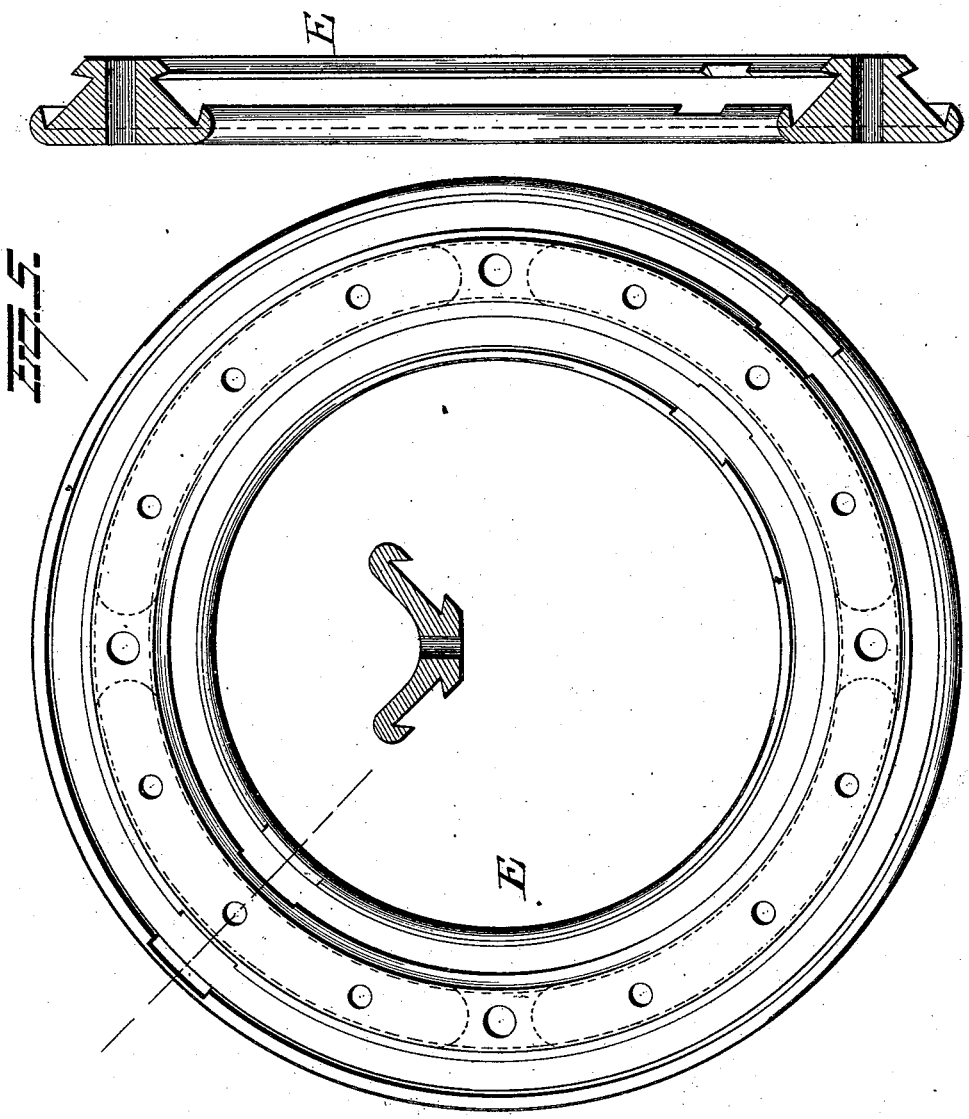
Witnesses
Inventor
John R. Morgan.
Attorney (No Model.)  5 Sheets—Sheet 5.
J. R. MORGAN.
FRICTION CLUTCH.
No. 472,739.  Patented Apr. 12, 1892.
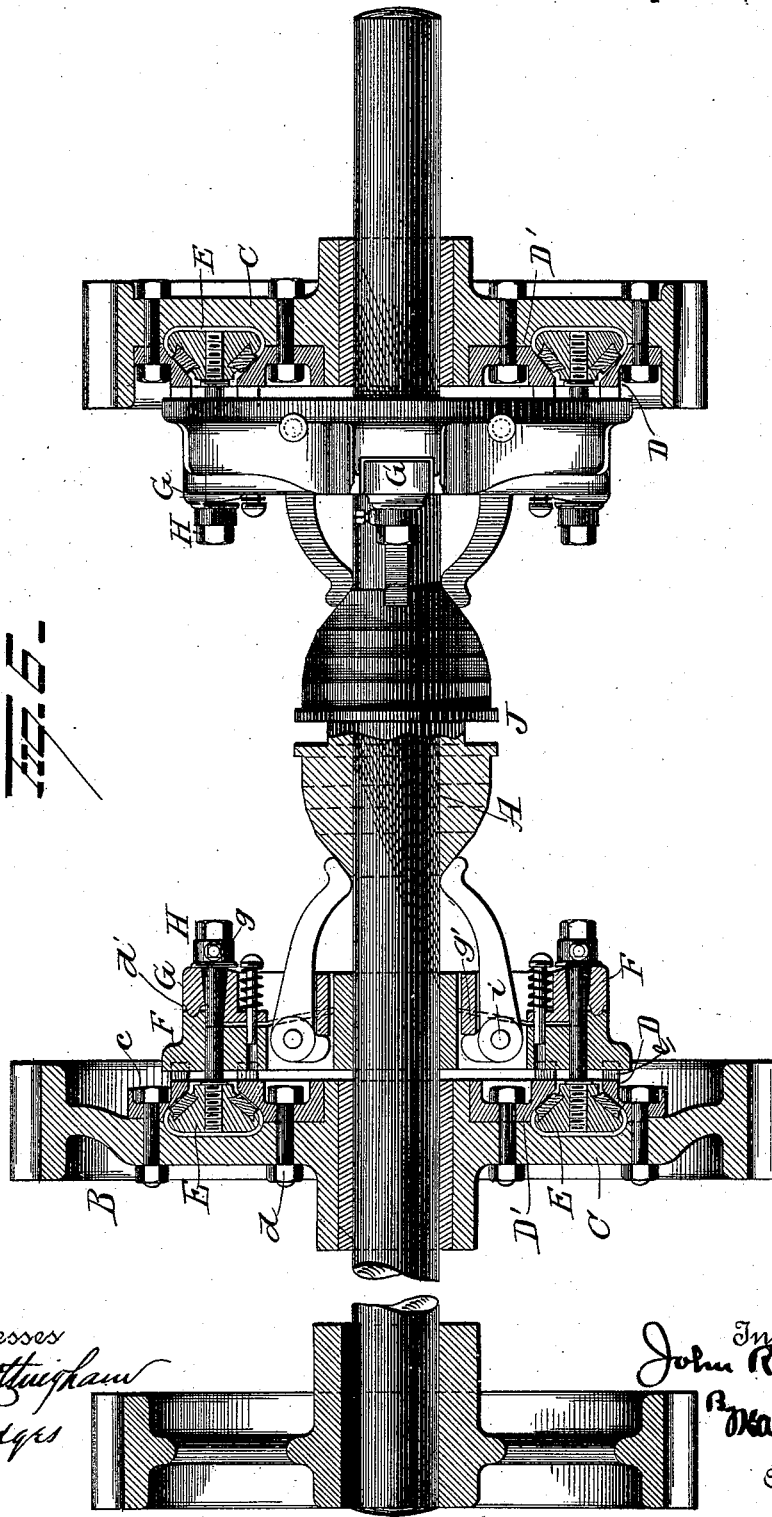
Witnesses  Inventor

UNITED STATES PATENT OFFICE.

JOHN R. MORGAN, OF ALLIANCE, OHIO, ASSIGNOR OF THREE-FOURTHS TO THOMAS R. MORGAN, SR., THOMAS R. MORGAN, JR., AND WILLIAM H. MORGAN, OF SAME PLACE.

FRICTION-CLUTCH.

SPECIFICATION forming part of Letters Patent No. 472,739, dated April 12, 1892.

Application filed July 10, 1891. Serial No. 398,993. (No model.)

*To all whom it may concern:*

Be it known that I, JOHN R. MORGAN, of Alliance, in the county of Stark and State of Ohio, have invented certain new and useful Improvements in Friction-Clutches; and I do hereby declare the following to be a full, clear, and exact description of the invention, such as will enable others skilled in the art to which it appertains to make and use the same.

My invention relates to an improvement in friction-clutches, and is designed more particularly as an improvement on the clutch shown and described in Letters Patent No. 265,953, granted October 17, 1882, to Dennis Frisbie. In the patented clutch above referred to one section thereof is shown as fast to one shaft and the other section fast to another shaft, the shafts being arranged end to end, so that they can be locked together. In this patent is also shown a series of friction-pieces, the bodies of which are triangular in cross-section and rest within a circular dovetailed recess in one section of the clutch, and with elongated stems or shanks, which pass through openings in the other section of the clutch, an independent lever for each friction-piece being provided, whereby the friction-pieces which are carried by the section of the clutch through which the stems pass are forced solidly into frictional contact with the other section of the clutch and lock the two sections together. In this patented device the friction-pieces are independent, and hence will, if not accurately adjusted, bear with varying pressure, thus throwing the greater part of the strain on one side of the clutch.

The object of the present invention is to adapt clutches of the character described to a single shaft and connect the clutches to toothed wheels of different sizes, one clutch being connected to one wheel and the other to another wheel, the two clutches being actuated by devices common to both, so that the speed of the shaft or the speed of the parts driven by the wheels on said shaft can be changed as necessity demands.

A further object is to increase the frictional contact-surface between the two sections of the clutch and so construct the parts that the pressure is equally distributed around all sides.

With these ends in view my invention consists in the parts and combinations of parts, as will be more fully described, and pointed out in the claims.

In the accompanying drawings, Figure 1 is a view in elevation showing the two clutches on a single shaft, one clutch being in section and the other in elevation. Fig. 2 is a front view of one of the clutches. Figs. 3 and 4 are detached views of the friction-rings. Fig. 5 is a view of the clutch-ring; and Fig. 6 is a view similar to Fig. 1, showing a slightly-modified form.

A represents a shaft, having thereon two spur-wheels B B' of different sizes for transmitting varying speeds from or to the shaft A. These wheels are separated sufficiently for the introduction between them of two clutches. As these clutches are alike, a description of one will suffice for both. The wheels B and B' are loosely mounted on the shaft, and to each wheel a friction-disk C is rigidly secured by bolts or otherwise. The friction-disk is provided on its inner face near its periphery with a continuous or endless groove or gutter $a$ and is also provided with seats for the two friction-rings D D', which latter are rigidly secured in place by bolts $c$ and $d$. The bolts $d$, which secure the inner ring in place, also assist in securing the friction-disk in the spur-wheel. The inner ring D' is provided on its outer edge with an inclined face, and the outer ring D is provided on its inner edge with an inclined face, the two inclined faces converging toward the outer faces of the rings forming, together with the groove $a$ in disk C, a triangular recess.

Located within the triangular recess formed by the disk and two rings is the clutch-ring E, the latter being slightly smaller than the recess, so that it has a limited movement therein. This clutch-ring is provided with two inclined faces corresponding with the inclined faces of the rings D D', each inclined face having a continuous dovetailed recess within which are secured blocks of hard wood, adapted, when the ring is drawn outwardly, to make contact with said inclined faces on the rings. The ring is provided at suitable intervals with any number of stems F', which latter pass outwardly through the space between the rings D D' and pass through the wheel F. The wheel F is secured to the shaft, so as to turn therewith, and is provided on its face adjacent to the rings D D' with wooden blocks e, which latter, when power is applied to clutch the parts, also bear against the outer smooth faces of the rings. Thus it will be seen that when the clutch-ring is moved to clutch the parts the blocks on the clutch-ring and the blocks on wheel F grip the rings D D' between them and carry said rings, clutch-disk, and spur-wheel around with them.

G are a series of levers, one for each stem F'. In the drawings I have shown four stems connected to the single clutch-ring and four levers; but I can employ a greater or less number, if I so desire. Each lever is fulcrumed at d on wheel F, and is provided with an opening for the passage of its respective stem. Rigidly secured to the wheel F are a series of bolts—one for each lever—which latter pass through holes in their respective levers and are encircled each by a spring, which latter bears at one end against the lever and at the other end against the head of the bolt, the said springs tending to force the inner ends of the levers toward the clutch, thereby withdrawing the strain from the stems and clutch-ring.

Each stem is provided with a washer, which latter rests against its respective lever, the said washers being supported by the split nuts H. These nuts are first adjusted on the stems and then locked by the screws g, which latter cause the nuts to clamp the bolts and be held against any movement. By this arrangement the parts can be accurately adjusted, so that the clutch-ring bears with equal pressure throughout the surfaces of the friction-rings.

The levers G are slotted near their inner ends for the passage of bell-crank levers, to be hereinafter referred to, and each is provided with a rearwardly-projecting lip g', against which the short arms of the bell-crank levers bear. These bell crank levers I are pivoted at i to the wheel F, with their short arms in contact with the lips g' and their longer arms projecting inwardly and in the path of the double cone J. The two clutches are so located that when the cone J is midway between them neither clutch is in locked position, and hence the rotatable parts operate without transmitting motion to the other parts. Thus if the shaft transmits motion to the wheels the shaft would rotate without moving the wheels, and if the wheels transmit motion to the shaft the wheels would run loosely on the shaft. Now, by moving the cone to one side the free ends of the bell-crank levers of one clutch would be separated, and the short arms of said levers bearing against the lips g' would draw the inner ends of levers G outwardly, and they in turn would draw evenly on stems F', causing the clutch-ring to bind against the friction-rings, thereby locking the parts of the clutch together. If the clutch be connected with the larger wheel and the wheel receives its motion from the shaft, the speed would be greater than the speed from the smaller wheel.

In the modification I have dispensed with the disk for the friction-rings and secured the rings directly to the spur-wheels.

It is evident that numerous slight changes and alterations may be made in the relative arrangement of parts without departing from the spirit of my invention. Hence I would have it understood that I do not confine myself to the exact construction and arrangement of parts herein shown and described; but, Having fully described my invention, what I claim as new, and desire to secure by Letters Patent, is—

1. The combination, with a shaft and two wheels of different diameters loose on said shaft, of a clutch for each wheel, each clutch consisting, essentially, of two rings fast to a wheel and having beveled faces, one ring being located within the other, a clutch-ring having faces corresponding with the beveled faces of the rings, a wheel rigidly secured to the shaft-stems secured to the clutch-ring and passing through the wheel rigid on the shaft, and levers actuated by a cone for forcing the frictional surfaces of the clutch-ring into contact with the frictional surfaces of the friction-rings, substantially as set forth.

2. The combination, with a shaft and a wheel loose thereon, of two friction-rings carried by the wheel, a clutch-ring having contact-faces for engaging the friction-rings, a wheel fast on the shaft, a series of stems secured to the clutch-ring and passing through the wheel fast on the shaft, and levers for actuating the clutch-ring, substantially as set forth.

3. In a friction-clutch, the combination, with a shaft, a wheel loose thereon, and two friction-rings carried by said wheel, of a wheel fast on the shaft and provided with friction-blocks for contact with the outer faces of said rings, a clutch-ring having blocks for engaging the inner faces of the friction-rings, and means for actuating the parts for locking the parts of the clutch together.

4. In a friction-clutch, the combination, with a shaft, a wheel loose thereon, a friction-disk rigidly secured to the wheel, and two friction-rings secured to the disk, of a clutch-ring for engaging the inner faces of the friction-rings, a wheel rigidly secured on the shaft, stems secured to the clutch-ring and passing through the wheel rigid on the shaft, and a series of levers engaging the stems for actuating the clutch-ring.

5. In a friction-clutch, the combination, with a shaft, a wheel loose thereon, a friction-disk rigidly secured to the wheel, and two friction-rings, each having a beveled face and arranged as shown, of a wheel fast on the shaft, a clutch-ring having two beveled faces, stems secured to the clutch-ring and passing through the wheel fast on the shaft, and a series of levers for actuating the ring, substantially as set forth.

In testimony whereof I have signed this specification in the presence of two subscribing witnesses.

JOHN R. MORGAN.

Witnesses:
FRANK E. DUSSEL,
H. W. HARRIS.